US012717264B2

(12) United States Patent
Aikawa

(10) Patent No.: US 12,717,264 B2
(45) Date of Patent: Aug. 25, 2026

(54) POWER SUPPLY DEVICE AND IMAGE FORMING APPARATUS

(71) Applicant: KYOCERA Document Solutions Inc., Osaka (JP)

(72) Inventor: Yukihiro Aikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/088,160

(22) Filed: Mar. 24, 2025

(65) Prior Publication Data

US 2025/0321531 A1 Oct. 16, 2025

(30) Foreign Application Priority Data

Apr. 16, 2024 (JP) ................................ 2024-066319

(51) Int. Cl.
*G03G 15/00* (2006.01)
*G03G 15/06* (2006.01)

(52) U.S. Cl.
CPC ........... *G03G 15/80* (2013.01); *G03G 15/065* (2013.01); *G03G 15/5004* (2013.01); *G03G 2215/00978* (2013.01)

(58) Field of Classification Search
CPC ............. G03G 15/065; G03G 15/0907; G03G 15/1675; G03G 15/80; G03G 15/5004; G03G 2215/00978; H02M 1/009; H02M 1/10; H02M 7/043; H02M 7/003
USPC .................................. 399/88, 270, 285, 314
See application file for complete search history.

(56) References Cited

U.S. PATENT DOCUMENTS

| | | | | |
|---|---|---|---|---|
| 4,771,373 | A * | 9/1988 | Rademaker | H02M 7/2176 363/89 |
| 2018/0067416 | A1* | 3/2018 | Nakajima | G03G 15/0266 |
| 2020/0133181 | A1* | 4/2020 | Nakajima | H02H 7/20 |
| 2023/0075031 | A1* | 3/2023 | Shimizu | G03G 15/065 |

FOREIGN PATENT DOCUMENTS

| | | |
|---|---|---|
| JP | 2011232450 A | 11/2011 |

* cited by examiner

*Primary Examiner* — Robert B Beatty
(74) *Attorney, Agent, or Firm* — Alleman Hall LLP

(57) ABSTRACT

A power supply device according to the present disclosure includes an AC voltage output circuit and a DC voltage output circuit. The DC voltage output circuit includes a first voltage dividing resistor provided between a power supply line of a voltage output portion and a ground potential, a second voltage dividing resistor provided between the first voltage dividing resistor and the ground potential, a capacitor provided in parallel with the second voltage dividing resistor, and an operational amplifier. An output of the AC voltage output circuit is connected to the voltage output portion of the DC voltage output circuit. A cutoff frequency of a low-pass filter circuit constituted of the first voltage dividing resistor, the second voltage dividing resistor, and the capacitor is set to be lower than a frequency of the AC voltage output from the AC voltage output circuit.

8 Claims, 4 Drawing Sheets

POWER SUPPLY DEVICE AND IMAGE FORMING APPARATUS

INCORPORATION BY REFERENCE

This application is based upon and claims the benefit of priority from the corresponding Japanese Patent Application No. 2024-066319 filed on Apr. 16, 2024, the entire contents of which are incorporated herein by reference.

BACKGROUND

The present disclosure relates to a power supply device and an image forming apparatus.

Image forming apparatuses that use electrophotography, such as a copying machine, a printer, and a facsimile, are known. The image forming apparatus includes a developing device which develops an electrostatic latent image formed on a surface of an image-carrying member using toner. In the image forming apparatus, a bias voltage in which an AC voltage and a DC voltage are superimposed is applied to the developing device. It is noted that the AC voltage is applied for activating a toner movement between a developing roller which retains the toner and the image-carrying member. Further, a concentration of the toner that adheres onto the image-carrying member by the development is determined by the DC voltage.

In an image forming apparatus which forms an image using toner of a plurality of colors like a color image forming apparatus, there is a need to supply a DC voltage corresponding to the toner to each of the developing devices. Therefore, a development power supply device which generates the bias voltage includes a plurality of DC voltage output circuits provided in correspondence with the number of developing devices and one AC voltage output circuit that supplies an AC voltage to each of those DC voltage output circuits.

SUMMARY

A power supply device according to an aspect of the present disclosure is a power supply device which generates a bias voltage in which an AC voltage and a DC voltage are superimposed and applies the bias voltage to a voltage application target included in an image forming apparatus. The power supply device includes an AC voltage output circuit which outputs the AC voltage and a DC voltage output circuit which generates a DC voltage corresponding to the voltage application target. The DC voltage output circuit includes a first voltage dividing resistor provided between a power supply line of a voltage output portion and a ground potential, a second voltage dividing resistor provided between the first voltage dividing resistor and the ground potential, a capacitor provided in parallel with the second voltage dividing resistor, and an operational amplifier which outputs a voltage that has been amplified based on a resistance partial voltage divided by the first voltage dividing resistor to the power supply line. An output of the AC voltage output circuit is connected to the voltage output portion of the DC voltage output circuit. A cutoff frequency of a low-pass filter circuit constituted of the first voltage dividing resistor, the second voltage dividing resistor, and the capacitor is set to be lower than a frequency of the AC voltage output from the AC voltage output circuit.

An image forming apparatus according to another aspect of the present disclosure includes the power supply device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It is noted that the following embodiment is an example of embodying the present disclosure and does not limit the technical scope of the present disclosure.

Figure 1:
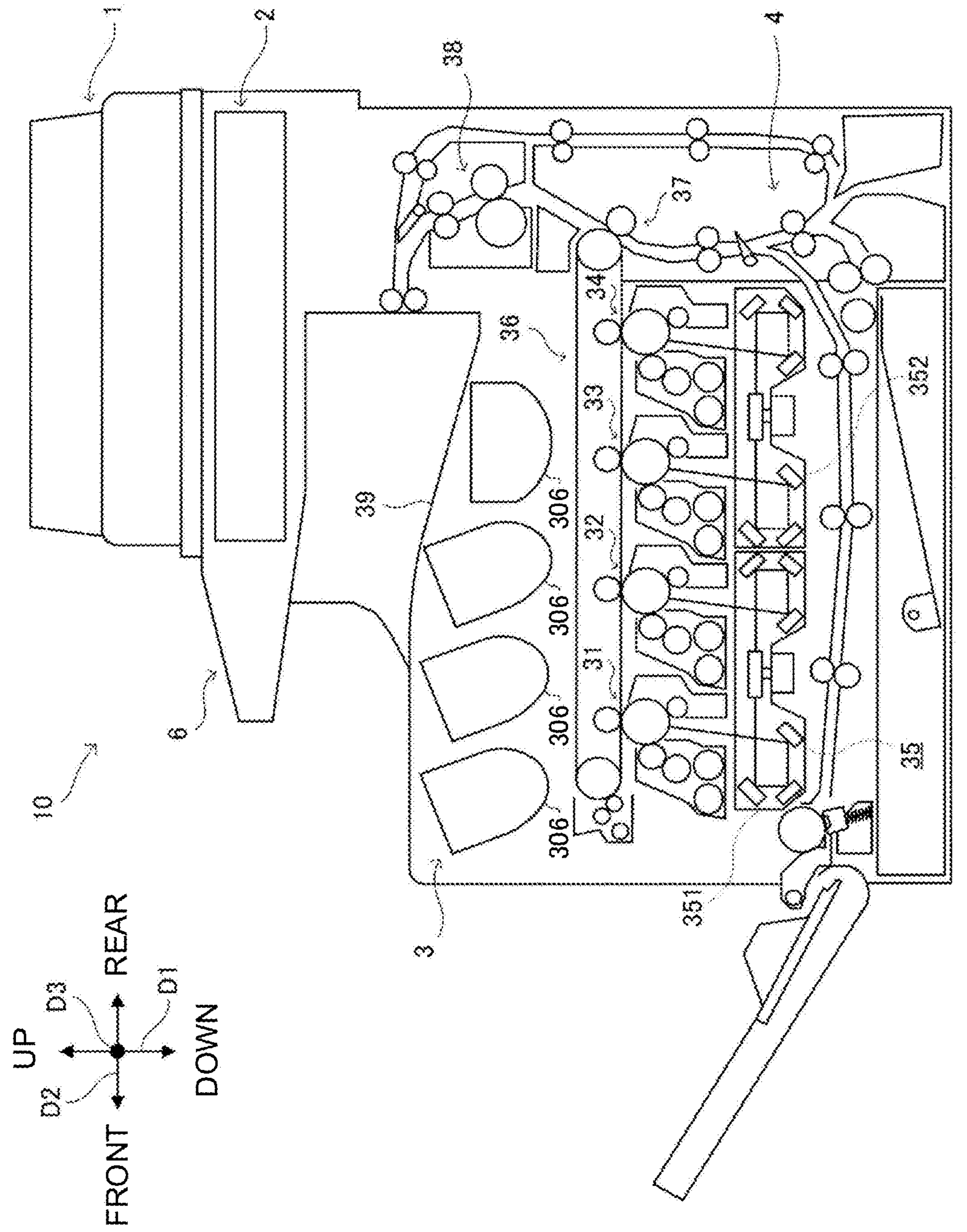
FIG. 1 is a diagram showing a configuration of an image forming apparatus according to an embodiment of the present disclosure.

FIG. 1 is a diagram showing a configuration of an image forming apparatus 10 according to the present embodiment. In FIG. 1, for convenience of descriptions, a vertical direction in a state where the image forming apparatus 10 is installed in a usable state is defined as an up-down direction D1. In addition, a front-rear direction D2 is defined with a surface of the image forming apparatus 10 on a left side of a sheet surface being a front surface (front side). In addition, a left-right direction D3 is defined using the front surface of the image forming apparatus 10 in the installed state as a reference.

As shown in FIG. 1, the image forming apparatus 10 is a multifunction peripheral having a plurality of functions such as a scanning function for reading image data from a document sheet, a printing function for forming an image based on image data, a facsimile function, and a copying function. The image forming apparatus 10 only needs to have a function of forming an image and may be a printer, a facsimile apparatus, a copying machine, or the like.

The image forming apparatus 10 includes an automatic document sheet conveying device 1, an image reading portion 2, an image forming portion 3, a sheet feed portion 4, an operation display portion 6, and a control portion (not shown) which collectively controls these. Since the automatic document sheet conveying device 1 is an ADF (Auto Document Feeder), the automatic document sheet conveying device 1 will be noted as "ADF" in FIG. 1 and will be referred to as "ADF 1" in descriptions below.

The ADF 1 conveys a document sheet from which an image is to be read by the image reading portion 2. The ADF 1 includes a document sheet setting portion, a plurality of conveying rollers, a document sheet holder, a sheet discharge portion, and the like.

The image reading portion 2 reads an image from a document sheet and outputs image data corresponding to the read image. The image reading portion 2 includes a document sheet table, a light source, a plurality of mirrors, an optical lens, a CCD (Charge Coupled Device), and the like.

The image forming portion 3 realizes the printing function by forming a color or monochrome image on a sheet using electrophotography. The image forming portion 3 forms an image on a sheet based on image data output from the image reading portion 2. Further, the image forming portion 3 forms an image on a sheet based on image data input from an information processing apparatus such as a personal computer.

The sheet feed portion 4 supplies sheets to the image forming portion 3. The sheet feed portion 4 includes a sheet feed cassette, a manual feed tray, a sheet conveying path, a plurality of conveying rollers, and the like. The image forming portion 3 forms an image on a sheet supplied from the sheet feed portion 4.

The control portion collectively controls the image forming apparatus 10. The control portion has, as a main configuration thereof, a computer system including one or more processors and one or more memories. In the image forming apparatus 10, the one or more processors execute programs to realize functions of the control portion.

The operation display portion 6 is a user interface of the image forming apparatus 10. The operation display portion 6 includes a display portion such as a liquid crystal display that displays various types of information in response to control instructions from the control portion, and an operation portion such as a switch or a touch panel that is used for inputting various types of information to the control portion according to user operations.

Figure 2:
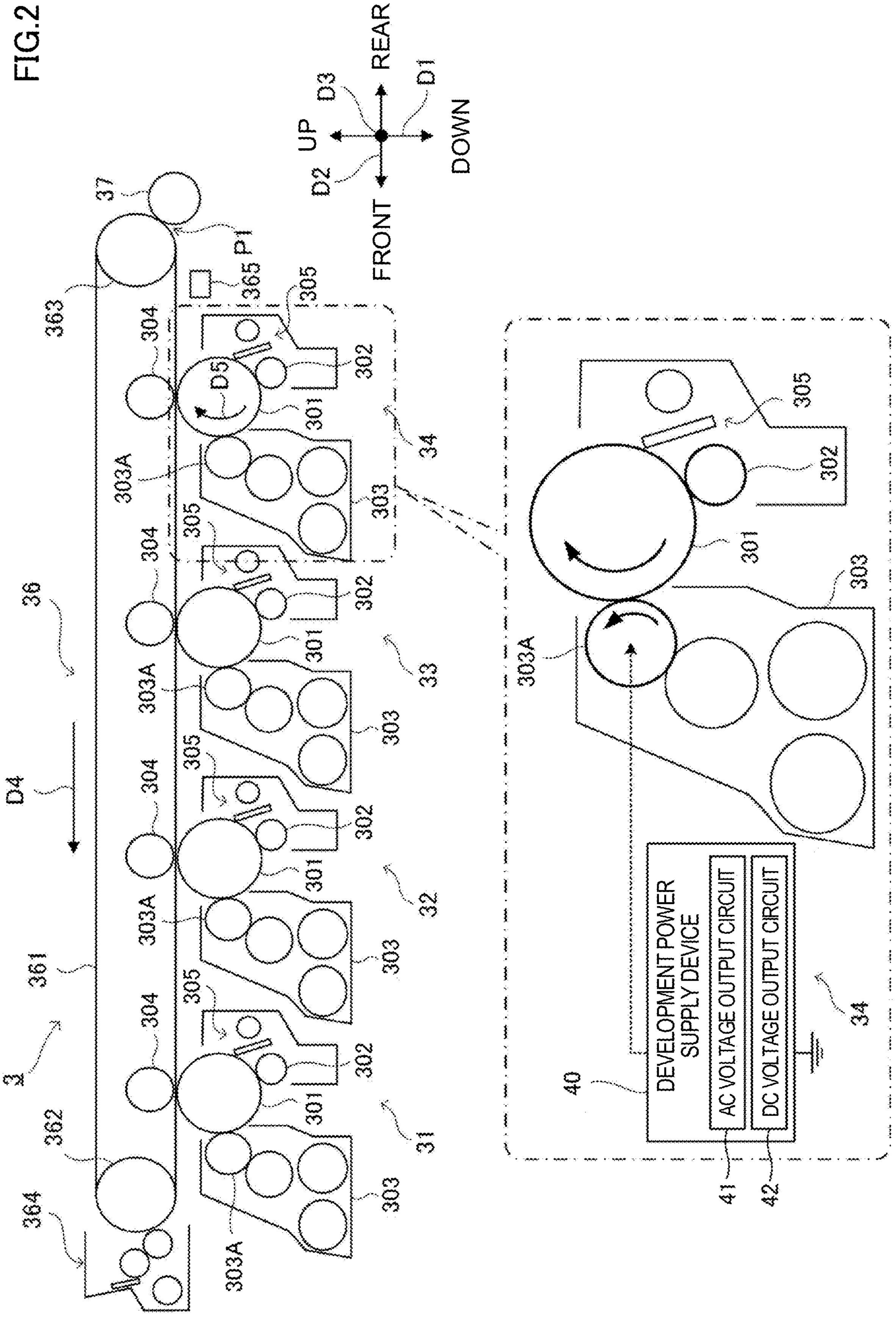
FIG. 2 is a diagram showing a configuration of an image forming portion of the image forming apparatus according to the embodiment of the present disclosure.

The image forming portion 3 performs processing for forming an image using toner of four colors. The image forming portion 3 includes four image forming units 31 to 34, a laser scanning device 35, an intermediate transfer device 36, a secondary transfer roller 37, a fixing device 38, a sheet discharge tray 39, and a development power supply device 40 (an example of a power supply device according to the present disclosure). FIG. 2 shows, in a bubble, a schematic enlarged view of a configuration of one image forming unit 34 out of the four image forming units 31 to 34

The image forming unit 31 forms a toner image of Y (yellow). The image forming unit 32 forms a toner image of C (cyan). The image forming unit 33 forms a toner image of M (magenta). The image forming unit 34 forms a toner image of K (black).

The plurality of image forming units 31 to 34 respectively correspond to four colors of Y (yellow), C (cyan), M (magenta), and K (black) and have a common configuration except that different types of toner are used.

As shown in FIG. 2, each of the four image forming units 31 to 34 includes a photoconductor drum 301 (an example of an image-carrying member), a charging roller 302, a developing device 303 including a developing roller 303A (an example of a voltage application target and roller member according to the present disclosure), a primary transfer roller 304, a drum cleaning portion 305, and a toner container 306 (see FIG. 1).

The development power supply device 40 is a power supply device which generates a bias voltage (developing bias) in which an AC voltage and a DC voltage are superimposed, and applies the bias voltage to the developing roller 303A of each of the developing devices 303. The bias voltage is a voltage that is applied between the developing roller 303A and the photoconductor drum 301, and the toner moves from the developing roller 303A to the photoconductor drum 301 due to a potential difference generated between the developing roller 303A and the photoconductor drum 301 by the application of the bias voltage.

Further, by the application of the bias voltage (developing bias), a developing current flows between the developing roller 303A and the photoconductor drum 301. The developing current also contains a toner current that flows along with the movement of the toner.

The development power supply device 40 includes an AC voltage output circuit 41 (see FIG. 3) that outputs the AC voltage and a plurality of DC voltage output circuits 42 that generate DC voltages respectively corresponding to the developing rollers 303A of the plurality of developing devices 303. Configurations of the AC voltage output circuit 41 and the DC voltage output circuits 42 will be described later.

An electrostatic latent image is formed on the photoconductor drum 301. The photoconductor drum 301 is supported by a unit housing that houses the photoconductor drum 301, the charging roller 302, and the drum cleaning portion 305 while being rotatable about a rotation shaft extending in the left-right direction D3. The photoconductor drum 301 rotates in a rotation direction D5 shown in FIG. 2 upon receiving a driving force supplied from a motor, for example.

The charging roller 302 charges a surface (outer circumferential surface) of the photoconductor drum 301 to a positive polarity. Specifically, the charging roller 302 charges the surface of the photoconductor drum 301 by receiving an application of a high voltage from a charging power supply device (not shown). However, the charging roller 302 is not limited to the configuration in which the surface of the photoconductor drum 301 is charged to the positive polarity, and may alternatively charge the surface of the photoconductor drum 301 to a negative polarity.

The surface of the photoconductor drum 301 charged by the charging roller 302 is irradiated with light that is based on image data from the laser scanning device 35. Thus, an electrostatic latent image is formed on the surface of the photoconductor drum 301. In other words, a portion of the surface of the photoconductor drum 301 that has been irradiated with the light from the laser scanning device 35 becomes an "image portion".

The developing device 303 executes developing processing to develop the electrostatic latent image formed on the surface of the photoconductor drum 301. In particular, in the present embodiment, the developing device 303 performs development using two-component developer containing toner and a carrier. The developing device 303 includes a case, a pair of stirring members, a magnet roller, and the developing roller 303A. The case supports the pair of stirring members, the magnet roller, and the developing roller 303A so that they can rotate about a rotation shaft extending in the left-right direction D3. The case also stores the toner of the color used in the developing device 303 and the carrier. The pair of stirring members stir the toner and carrier stored in the case to charge the toner. In the present embodiment, the toner is charged to the positive polarity. However, the charging polarity of the toner is not limited to the positive polarity and may alternatively be the negative polarity. The magnet roller picks up the toner and carrier stirred by the pair of stirring members and supplies the toner to a surface (outer circumferential surface) of the developing roller 303A.

The developing roller 303A uses the charged toner to develop the electrostatic latent image formed on the photoconductor drum 301. Specifically, the developing roller 303A is electrically connected to the development power supply device 40, and a bias voltage (developing bias) in which an AC voltage and a DC voltage generated by the development power supply device 40 are superimposed is applied to the developing roller 303A. Thus, a potential difference is generated between the developing roller 303A and the photoconductor drum 301, and the toner on the developing roller 303A is supplied to the surface of the photoconductor drum 301 by this potential difference. In other words, a developing electric field is formed by applying a high-voltage bias voltage between the developing roller 303A and the photoconductor drum 301 by the development power supply device 40, and the toner including charges moves from the developing roller 303A to the photoconductor drum 301. Thus, a toner image corresponding to the electrostatic latent image is formed on the surface of the photoconductor drum 301.

The primary transfer roller 304 transfers the toner image that has been formed on the surface of the photoconductor drum 301 by the developing device 303 onto an outer circumferential surface of an intermediate transfer belt 361 (see FIG. 2). Specifically, the primary transfer roller 304 transfers the toner image formed on the surface of the photoconductor drum 301 onto the outer circumferential surface of the intermediate transfer belt 361 by receiving an application of a high voltage from a transfer power supply device (not shown). In other words, a transfer electric field is formed by applying a high-voltage transfer bias between the photoconductor drum 301 and the primary transfer roller 304 by the transfer power supply device, and the toner including charges moves from the photoconductor drum 301 to the intermediate transfer belt 361. Thus, the toner image is formed (transferred) onto the outer circumferential surface of the intermediate transfer belt 361.

The drum cleaning portion 305 cleans the surface of photoconductor drum 301 after the toner image is transferred by the primary transfer roller 304. For example, the drum cleaning portion 305 includes a blade-like cleaning member and a conveying member. The cleaning member comes into contact with the surface of the photoconductor drum 301 to remove the toner that has adhered onto the surface. The conveying member conveys the toner removed by the cleaning member to a toner storage container.

The toner container 306 supplies the toner to the case of the developing device 303 corresponding to the color of the toner stored therein.

The laser scanning device 35 forms an electrostatic latent image on each of the photoconductor drums 301 of the four image forming units 31 to 34. In the present embodiment, the laser scanning device 35 includes two laser scanning units 351 and 352.

The toner images of the respective colors that have respectively been formed by the plurality of image forming units 31 to 34 are transferred in a superimposed manner onto the outer circumferential surface of the intermediate transfer belt 361. Thus, a color image (toner image) is formed on the outer circumferential surface of the intermediate transfer belt 361.

As shown in FIG. 2, the intermediate transfer device 36 includes the intermediate transfer belt 361, a drive roller 362, a tension roller 363, and a belt cleaning portion 364. The intermediate transfer device 36 uses the intermediate transfer belt 361 to convey the toner image formed by the image forming units 31 to 34 to a transfer position P1 (see FIG. 2) for transfer by the secondary transfer roller 37.

The intermediate transfer belt 361 is an endless belt onto which the toner images of the respective colors are transferred from the photoconductor drums 301. The intermediate transfer belt 361 is wound around the drive roller 362 and the tension roller 363 that are spaced apart from each other in the front-rear direction D2 of the image forming apparatus 10. The drive roller 362 rotates upon receiving a driving force supplied from a motor. This causes the intermediate transfer belt 361 to rotate in a rotation direction D4 shown in FIG. 2. The toner image transferred onto the outer circumferential surface of the intermediate transfer belt 361 is conveyed to the transfer position P1 for transfer by the secondary transfer roller 37 along with the rotation of the intermediate transfer belt 361. The belt cleaning portion 364 cleans the outer circumferential surface of the intermediate transfer belt 361 after the toner image is transferred at the transfer position P1.

The secondary transfer roller 37 transfers the toner image formed on the outer circumferential surface of the intermediate transfer belt 361 onto a sheet supplied by the sheet feed portion 4. As shown in FIG. 2, the secondary transfer roller 37 is arranged at a position opposing the tension roller 363 across the intermediate transfer belt 361 so as to come into contact with the outer circumferential surface of the intermediate transfer belt 361. The secondary transfer roller 37 is pressed toward the tension roller 363 side by a bias member. The secondary transfer roller 37 is electrically connected to a power supply circuit (not shown). The secondary transfer roller 37 transfers the toner image formed on the outer circumferential surface of the intermediate transfer belt 361 onto a sheet that passes through the transfer position P1 (see FIG. 2) by receiving an application of a high voltage from the power supply circuit. The transfer position P1 is a position at which the secondary transfer roller 37 and the intermediate transfer belt 361 come into contact with each other.

The fixing device 38 melts and fixes the toner image that has been transferred onto the sheet by the secondary transfer roller 37 onto the sheet. For example, the fixing device 38 includes a fixing roller and a pressure roller. The fixing roller is arranged so as to come into contact with the pressure roller, and heats the toner image transferred onto the sheet to fix the toner image onto the sheet. The pressure roller pressurizes the sheet that passes through a contact portion formed between the fixing roller and the pressure roller.

The sheet on which the image has been formed is discharged onto the sheet discharge tray 39.

Incidentally, when an AC voltage branched from an output of the AC voltage output circuit 41 of the development power supply device 40 is connected to an output portion of each of the plurality of DC voltage output circuits 42 to generate the bias voltage, the following problem may occur. For example, in order to prevent the AC voltage from the AC voltage output circuit 41 from affecting each of the DC voltage output circuits 42, there is a need to provide an output resistor with a relatively large impedance in series with an output line of the DC voltage output circuit 42. However, in a case where the output resistor is large, for example, when an image such as a solid image in which a large amount of toner moves to the photoconductor drum 301 is developed, a developing current temporarily becomes large to cause a voltage drop of the DC voltage, and this causes insufficient development of lines near the solid image, resulting in a defective image in which a concentration of the lines after image formation becomes low.

In contrast, the development power supply device 40 of the image forming apparatus 10 according to the present embodiment has a configuration described below and is therefore not affected by the AC voltage from the AC voltage output circuit 41 (see FIG. 3) and is less likely to cause a voltage drop of the DC voltage in the DC voltage output circuit 42. Therefore, the development power supply device 40 is capable of constantly supplying a stable bias voltage despite its simple configuration.

As described above, the development power supply device 40 according to the present embodiment includes the AC voltage output circuit 41 (see FIG. 3) and the plurality of DC voltage output circuits 42. The development power supply device 40 includes one AC voltage output circuit 41 and the DC voltage output circuits 42 in a number corresponding to the number of developing devices 303 (four in the present embodiment). In the development power supply device 40, the output of the AC voltage output circuit 41 is branched plurally to be connected to a voltage output portion Vout2 (see FIG. 4) of each of the plurality of DC voltage output circuits 42. Thus, a bias voltage in which an AC voltage is superimposed on a DC voltage is output from the voltage output portion.

Figure 3:
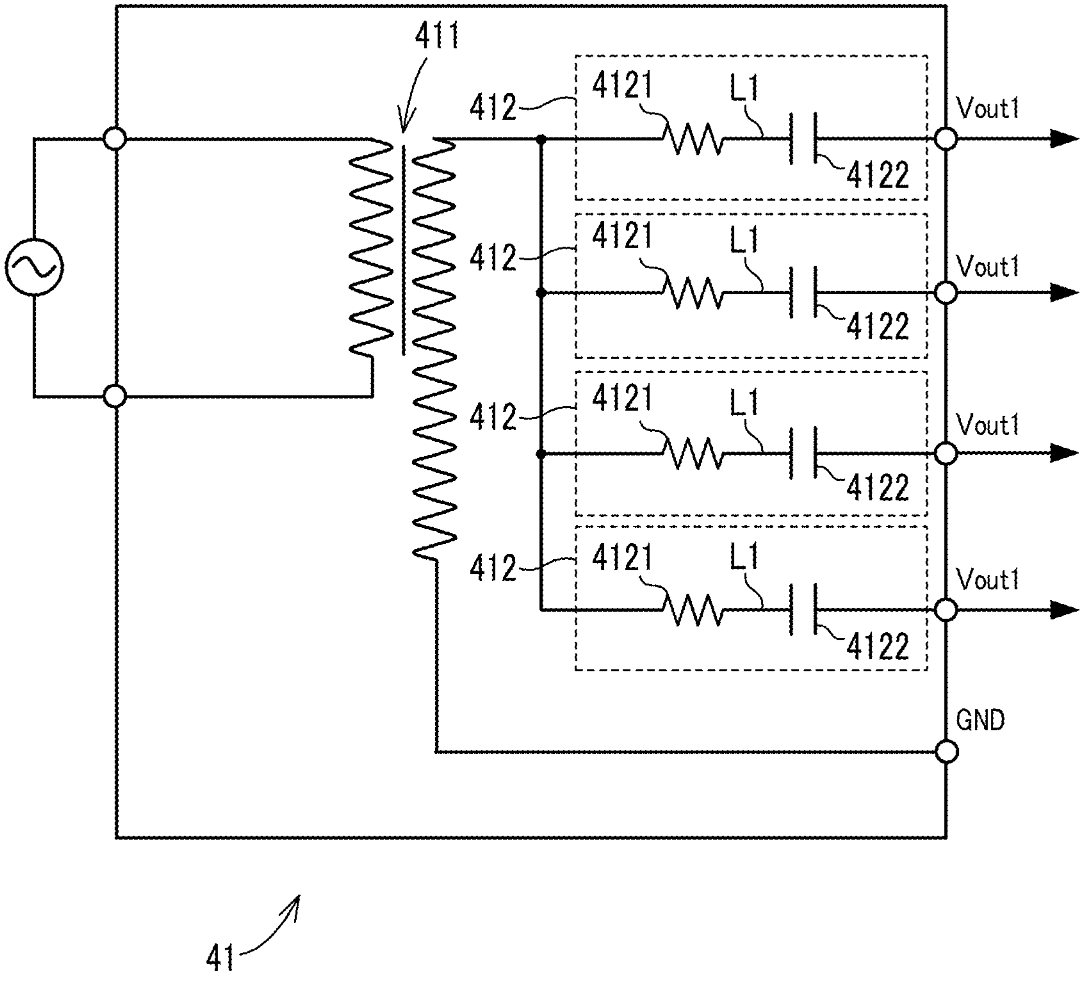
FIG. 3 is a circuit diagram showing an example of an AC voltage output circuit according to the embodiment of the present disclosure.
Figure 4:
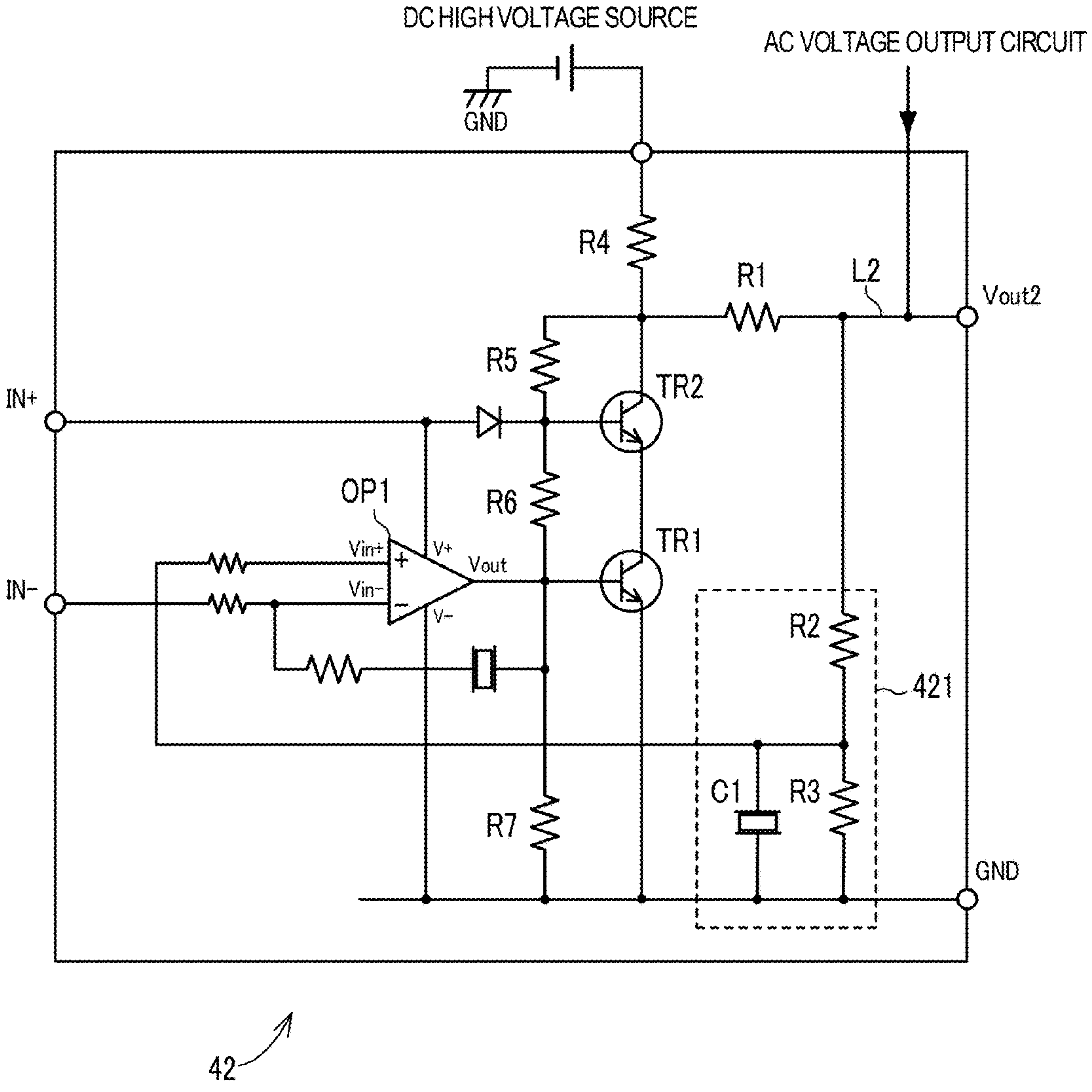
FIG. 4 is a circuit diagram showing an example of a DC voltage output circuit according to the embodiment of the present disclosure.

FIG. 3 is a circuit diagram schematically showing a configuration of the AC voltage output circuit 41, and FIG. 4 is a circuit diagram schematically showing a configuration of the DC voltage output circuit 42. Each of the circuit diagrams shown in FIG. 3 and FIG. 4 is a simplified diagram in which illustrations of electronic elements and wiring excluding a main portion of the present disclosure are omitted.

As shown in FIG. 3, the AC voltage output circuit 41 includes a transformer 411 that transforms an AC voltage (primary AC voltage) input from outside at a predetermined transformation ratio, and four branch circuits 412 that branch an output of the transformed AC voltage (secondary AC voltage) that has been transformed by the transformer 411 into four. The output of each of the four branch circuits 412 is connected to a power supply line L2 that leads to the voltage output portion Vout2 of the corresponding DC voltage output circuit 42, and the branched secondary AC voltage is superimposed on the DC voltage output from the DC voltage output circuit 42.

Each branch circuit 412 includes an internal resistor 4121 and a capacitor 4122 that are provided in series on the branch line L1. A voltage output portion Vout1 of each branch circuit 412 is coupled to a power supply line L2 of the DC voltage output circuit 42.

As shown in FIG. 4, the DC voltage output circuit 42 outputs an input DC voltage from the voltage output portion Vout2 via the power supply line L2. The DC voltage output circuit 42 includes an output resistor R1, a first voltage dividing resistor R2, a second voltage dividing resistor R3, internal resistors R4 to R7, a capacitor C1, an operational amplifier OP1 (an example of an operational amplifier according to the present disclosure), and transistors TR1 and TR2.

The output resistor R1 is provided in series on the power supply line L2 leading to the voltage output portion Vout2.

The first voltage dividing resistor R2 is provided between the power supply line L2 and a ground potential. The second voltage dividing resistor R3 is provided between the first voltage dividing resistor R2 and the ground potential. The first voltage dividing resistor R2 and the second voltage dividing resistor R3 are provided in series on a line that connects the power supply line L2 and the ground potential.

The capacitor C1 is connected in parallel with the second voltage dividing resistor R3, one end of the capacitor C1 is connected to the ground potential, and the other end is connected to an intermediate point between the first voltage dividing resistor R2 and the second voltage dividing resistor R3. The first voltage dividing resistor R2, the second voltage dividing resistor R3, and the capacitor C1 constitute a low-pass filter circuit 421.

An input terminal $V_{IN+}$ (non-inverting input terminal) of the operational amplifier OP1 is connected to the intermediate point between the first voltage dividing resistor R2 and the second voltage dividing resistor R3. In addition, for example, an analog voltage of a predetermined voltage that has been generated by the control portion is input to an input terminal $V_{IN-}$ (inverting input terminal) of the operational amplifier OP1. For example, the analog voltage may be supplied from an analog voltage output terminal of a CPU mounted on the control unit, or may be supplied from a DC/AC converter connected to the CPU.

The operational amplifier OP1 compares voltages of the input terminal $V_{IN+}$ and the input terminal $V_{IN-}$, and gradually increases an output voltage of the output terminal Vout of the operational amplifier OP1 when the voltage of the input terminal $V_{IN+}$ is higher. The output terminal Vout is connected to a base terminal of the transistor TR1. When a base voltage of the transistor TR1 increases, a collector current of the transistors TR1 and TR2 increases, and a voltage drop of the internal resistor R4 becomes large. Thus, the DC voltage of the voltage output portion Vout2 of the DC voltage output circuit 42 decreases.

Furthermore, the operational amplifier OP1 compares the voltages of the input terminal $V_{IN+}$ and the input terminal $V_{IN-}$, and gradually lowers the output voltage of the output terminal Vout of the operational amplifier OP1 when the voltage of the input terminal $V_{IN+}$ is lower. When the base voltage of the transistor TR1 is lowered, the collector current of the transistor TR1 is reduced, and the voltage drop of the internal resistor R4 becomes small. As a result, the DC voltage of the voltage output portion Vout2 of the DC voltage output circuit 42 becomes large.

Therefore, the DC voltage of the voltage output portion Vout2 is controlled to a voltage corresponding to the voltage of the input terminal $V_{IN-}$ of the operational amplifier OP1, and specifically, is calculated by the following equation (1).

$$Vout2 = [(R2 + R3)/R3] \times V_{IN-} \tag{1}$$

In the present embodiment, a cutoff frequency of the low-pass filter circuit 421 is set to be lower than a frequency of the AC voltage output from the AC voltage output circuit 41. In other words, resistance values of the first voltage dividing resistor R2 and the second voltage dividing resistor R3 and a capacitance of the capacitor C1 are determined such that the cutoff frequency becomes lower than the frequency of the AC voltage output from the AC voltage output circuit 41.

Since the cutoff frequency is set in this manner, when an AC voltage is input from the AC voltage output circuit 41 to the DC voltage output circuit 42, even if the AC voltage goes around to the low-pass filter circuit 421 side, the low-pass filter circuit 421 prevents the AC voltage from being input to the input terminal $V_{IN+}$ of the operational amplifier OP1. Therefore, no fluctuation occurs in the output of the operational amplifier OP1, and the output voltage of the DC voltage output circuit 42 is stabilized. In other words, in such a DC voltage output circuit 42, it is possible to supply a stable bias voltage without being affected by the AC voltage from the AC voltage output circuit 41.

On the other hand, it is desirable to set the cutoff frequency to be higher than a frequency of the developing current that flows from the developing roller 303A to the photoconductor drum 301 when the bias voltage is applied to the developing roller 303A during development of the photoconductor drum 301. In other words, the resistance values of the first voltage dividing resistor R2 and the second voltage dividing resistor R3 and the capacitance of the capacitor C1 are determined such that the cutoff frequency becomes higher than the frequency of the developing current. This is because it is desirable for the low-pass filter circuit 421 to be able to follow a current change that corresponds to the image data as a target of image forming processing.

For example, in a case where a circumferential speed (linear speed) of the photoconductor drum 301 during development is 200 [mm/sec], an electrostatic latent image of a plurality of line images (striped pattern) extending in the axial direction is formed on the surface of photoconductor drum 301, a line width thereof is 1 [mm], and a line interval in the circumferential direction is 1 [mm], a cycle in which the line images repeatedly oppose an opposing point with respect to the developing roller 303A is 1/100 seconds, and the developing current that flows during development has a frequency of 100 [Hz].

In a case where the low-pass filter circuit 421 cannot follow the frequency, the output resistor R1 causes a voltage drop due to the developing current, and therefore, the voltage of the voltage output portion Vout2 drops at black portions of the lateral lines (black portions constituting the striped pattern) where the current increases, and the voltage returns to normal at white portions of the lateral lines (white portions constituting the striped pattern). This may cause lowering of the concentration in the black portions of the lateral lines. To prevent this lowering of the concentration from occurring, it is desirable to set the cutoff frequency to be higher than the frequency of the developing current (for example, 150 [Hz]).

It is noted that although the development power supply device 40 which outputs the bias voltage to be applied to the developing roller 303A is exemplified as the power supply device according to the present disclosure in the embodiment described above, the present disclosure is not limited to this configuration. The power supply device according to the present disclosure can also be applied to the transfer power supply device which applies the transfer bias to the primary transfer roller 304. In this case, the voltage application target according to the present disclosure is the primary transfer roller 304, and the image-carrying member according to the present disclosure is the intermediate transfer belt 361.

[Notes of Disclosure]

Hereinafter, a general outline of the disclosure extracted from the embodiment described above will be noted. It is noted that the respective configurations and processing functions described in the notes below can be sorted and arbitrarily combined as appropriate.

<Note 1>

A power supply device which generates a bias voltage in which an AC voltage and a DC voltage are superimposed and applies the bias voltage to a voltage application target included in an image forming apparatus, including:

an AC voltage output circuit which outputs the AC voltage; and a DC voltage output circuit which generates a DC voltage corresponding to the voltage application target, in which the DC voltage output circuit includes a first voltage dividing resistor provided between a power supply line of a voltage output portion and a ground potential, a second voltage dividing resistor provided between the first voltage dividing resistor and the ground potential, a capacitor provided in parallel with the second voltage dividing resistor, and an operational amplifier which outputs a voltage that has been amplified based on a resistance partial voltage divided by the first voltage dividing resistor to the power supply line, an output of the AC voltage output circuit is connected to the voltage output portion of the DC voltage output circuit, and a cutoff frequency of a low-pass filter circuit constituted of the first voltage dividing resistor, the second voltage dividing resistor, and the capacitor is set to be lower than a frequency of the AC voltage output from the AC voltage output circuit.

<Note 2>

The power supply device according to note 1, in which the voltage application target is a roller member which causes toner to adhere onto an image-carrying member included in the image forming apparatus.

<Note 3>

The power supply device according to note 1, in which the voltage application target is a plurality of roller members which respectively cause toner to adhere onto image-carrying members included in the image forming apparatus, and the DC voltage output circuit is provided plurally in correspondence with the plurality of roller members.

<Note 4>

The power supply device according to note 3, in which the output of the AC voltage output circuit is branched plurally to be connected to the voltage output portion of each of the plurality of DC voltage output circuits.

<Note 5>

The power supply device according to note 4, in which the AC voltage output circuit includes a transformer which transforms a primary AC voltage that has been input at a predetermined transformation ratio to generate a secondary AC voltage, and a secondary-side output of the transformer is connected to the voltage output portion of each of the plurality of DC voltage output circuits.

<Note 6>

The power supply device according to note 2 or 3, in which the cutoff frequency is set to be higher than a frequency of a current that flows from the roller member to the image-carrying member by the application of the bias voltage.

<Note 7>

The power supply device according to note 2 or 3, in which the image-carrying member is a photoconductor drum on a surface of which an electrostatic latent image is formed, and the roller member is a developing roller which supplies the toner to the electrostatic latent image to develop the electrostatic latent image.

<Note 8>

An image forming apparatus, including the power supply device according to any one of notes 1 to 7.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A power supply device which generates a bias voltage in which an AC voltage and a DC voltage are superimposed and applies the bias voltage to a voltage application target included in an image forming apparatus, comprising:

an AC voltage output circuit which outputs the AC voltage; and a DC voltage output circuit which generates a DC voltage corresponding to the voltage application target, wherein the DC voltage output circuit includes a first voltage dividing resistor provided between a power supply line of a voltage output portion and a ground potential, a second voltage dividing resistor provided between the first voltage dividing resistor and the ground potential, a capacitor provided in parallel with the second voltage dividing resistor, and an operational amplifier which outputs a voltage that has been amplified based on a partial voltage divided by the first voltage dividing resistor from the power supply line, an output of the AC voltage output circuit is connected to the voltage output portion of the DC voltage output circuit, and a cutoff frequency of a low-pass filter circuit constituted of the first voltage dividing resistor, the second voltage dividing resistor, and the capacitor is set to be lower than a frequency of the AC voltage output from the AC voltage output circuit.

2. The power supply device according to claim 1, wherein the voltage application target is a roller member which causes toner to adhere onto an image-carrying member included in the image forming apparatus.

3. The power supply device according to claim 1, wherein the voltage application target is a plurality of roller members which respectively cause toner to adhere onto image-carrying members included in the image forming apparatus, and the DC voltage output circuit is provided plurally in correspondence with the plurality of roller members.

4. The power supply device according to claim 3, wherein the output of the AC voltage output circuit is branched plurally to be connected to the voltage output portion of each of the plurality of DC voltage output circuits.

5. The power supply device according to claim 4, wherein the AC voltage output circuit includes a transformer which transforms a primary AC voltage that has been input at a predetermined transformation ratio to generate a secondary AC voltage, and a secondary-side output of the transformer is connected to the voltage output portion of each of the plurality of DC voltage output circuits.

6. The power supply device according to claim 2, wherein the cutoff frequency is set to be higher than a frequency of a current that flows from the roller member to the image-carrying member by the application of the bias voltage.

7. The power supply device according to claim 2, wherein the image-carrying member is a photoconductor drum on a surface of which an electrostatic latent image is formed, and the roller member is a developing roller which supplies the toner to the electrostatic latent image to develop the electrostatic latent image.

8. An image forming apparatus, comprising the power supply device according to claim 1.

* * * * *